United States Patent [19]
Komatsu et al.

[11] 3,734,898
[45] May 22, 1973

[54] PROCESS FOR THE PREPARING OF RANDOM COPOLYMERS OF CONJUGATED DIENES AND VINYL AROMATIC HYDROCARBONS

[75] Inventors: Koei Komatsu; Shigeki Hayashi; Akira Ohishi; Mashato Sakai, all of Yokohama, Japan

[73] Assignee: Japan Synthetic Rubber Co. Ltd., Tokyo, Japan

[22] Filed: Apr. 5, 1971

[21] Appl. No.: 131,508

[30] Foreign Application Priority Data

Apr. 10, 1970 Japan..........................45/30161

[52] U.S. Cl................................260/84.3, 260/83.7
[51] Int. Cl..........................C08f 19/06, C08f 19/08
[58] Field of Search............................260/83.7, 84.3

[56] References Cited

UNITED STATES PATENTS

| | | | |
|---|---|---|---|
| 2,975,160 | 3/1961 | Zelinski | 260/83.7 |
| 3,558,575 | 1/1971 | Kackler | 260/83.7 |
| 3,580,895 | 5/1971 | Omishi et al. | 260/83.7 |

Primary Examiner—James A. Seidleck
Attorney—Sherman and Shalloway

[57] ABSTRACT

A process for copolymerization of a conjugated diolefin with a vinyl aromatic hydrocarbon by a lithium type initiator in the presence of a randomizer selected from anionic surface active compounds having a hydrophilic group represented by $-SO_3M$ or $-OSO_3M$ where M is Na or K, in 1 – 20 parts by weight of a hydrocarbon or halogenated hydrocarbon solvent per 1 part by weight of the monomers, which comprises initiating the polymerization reaction at 20°C. – 90°C. and polymerizing substantially all monomers at the maximum temperature below 150°C. without removal of polymerization heat.

11 Claims, No Drawings

PROCESS FOR THE PREPARING OF RANDOM COPOLYMERS OF CONJUGATED DIENES AND VINYL AROMATIC HYDROCARBONS

This invention relates to a process wherein in copolymerizing a conjugated diolefin with a vinyl aromatic hydrocarbon, the polymerization reaction is initiated by a lithium type initiator at a temperature within a specified range, followed by carrying out the reaction without removal of the polymerization heat.

Prior to the present invention in manufacturing a rubbery polymer by copolymerizing a conjugated diolefin with a vinyl aromatic hydrocarbon, it was customary to either remove the polymerization heat or apply heat after the initiation of the polymerization reaction so as to ensure that the temperature is maintained at a given level.

It has now been found that a marked reduction in the polymerization time can be effected by not by removing the polymerization heat after initiation of the polymerization reaction but by utilizing the temperature rise that results from the accumulation of the reaction heat. It has furthermore been found that by operating in this manner rubbery polymers can be provided the physical properties of which, e.g., cold flow, were superior to those obtained by the conventional process (where the temperature is held constant).

According to the invention process, in polymerizing a mixture of a conjugated diolefin and a vinyl aromatic hydrocarbon in the presence of a lithium type initiator and an adequate randomizer, the polymerization reaction is initiated at a temperature of 20° to 90°C, and thereafter the reaction is carried out without removal of the polymerization reaction heat. In the present invention the polymerization reaction is completed in a short period of time not by removing the polymerization reaction heat after the initiation of the reaction but utilizing the temperature rise of the reaction system that results from the accumulation of the reaction heat. As a result, rubbery polymers the molecular weight distribution of which is extensive and accordingly which possess excellent physical properties can be obtained.

Of the lithium type initiators which are available in accordance with the present invention, typical examples include metallic lithium; alkyl lithiums such as ethyl lithium, propyl lithium, n-butyl lithium, sec.-butyl lithium, tert.-butyl lithium and iso-butyl lithium; aryl lithiums such as phenyl lithium and tolyl lithium; alkenyl lithiums such as vinyl lithium and propenyl lithium; alkylene dilithiums such as tetramethylene dilithium and hexamethylene dilithium; arylene dilithiums such as 1,3-dilithiobenzene and 1,4-dilithiobenzene; as well as 1,3,5-trilithiocyclohexane, 1,2,5-trilithionaphthalene, 1,3,5,8-tetralithiodecane and 1,2-,3,5-tetralithio-4-hexylanthracene.

These lithium type initiators can be used either singly or in combinations of two or more and can be added to the reaction system in a state of a suspension or solution in a hydrocarbon solvent.

The lithium type initiator is usually used in an amount of 0.02 – 2 millimoles, and preferably 0.05 – 1 millimole per 100 grams of the monomer. The total amount may be divided into two or more portions and be incrementally added to the reaction system. When the reaction system contains some impurities, it is advantageous from the practical standpoint that the initiator is additionally used in sufficient amounts to inactivate the impurities.

Examples of the conjugated diolefins which are used in the present invention include 1,3-butadiene, isoprene and piperylene. Examples of the vinyl aromatic hydrocarbons, include styrene, divinylbenzene, alpha-methyl styrene, beta-methyl styrene, vinyl toluene, 1-vinyl naphthalene and 2-vinyl naphthalene, of which styrene is conveniently used.

These conjugated diolefins and vinyl aromatic hydrocarbons may be used either singly or in admixture of two or more, respectively.

A a suitable combination of a conjugated diolefin and a vinyl aromatic hydrocarbon, is, for example, 1,3-butadiene and styrene, or isoprene and styrene, or 1,3-butadiene, isoprene and styrene. As the 1,3-butadiene, the B-B fraction obtained by cracking of naphtha in which butanes and butenes are copresent can also be used.

The hydrocarbon solvent to be used in the present invention, include the aliphatic, alicyclic and aromatic hydrocarbons which are liquid under the polymerization conditions. Convenient hydrocarbon solvents include such, as for example, n-pentane, iso-pentane, n-hexane, n-heptane, n-octane, iso-octane, n-decane, cyclopentane, cyclohexane, methyl cyclopentane, ethyl cyclopentane, benzene, toluene and xylene. Further, the halogenated hydrocarbons can also be used as the solvent in the process of the present invention. Since the polymerization by means of a lithium type initiator proceeds by an ionic mechanism, generally the rate of polymerization increases with increasing polarity of the solvent. Therefore, the polymerization reaction proceeds at a still greater rate by the use of a halogenated hydrocarbon solvent. As suitable halogenated hydrocarbons, included are such as chlorobenzene, chlorotoluene, chloroxylene, orthodichlorobenzene, fluorobenzene, fluorotoluene, fluoroxylene and chloroethylbenzene.

The polymerization solvent is used in an amount of 1 – 20 parts by weight, preferably 2 – 10 parts by weight, per 1 part by weight of the monomer. If the solvent is used in an amount below 1 part by weight per 1 part by weight of the monomers, the polymerization reaction becomes too violent and is dangerous. On the other hand, if the amount of the solvent exceeds 20 parts by weight per part by weight of the monomers, the accumulation of the polymerization heat becomes so inadequate that the advantages of the invention cannot be attained.

The initiation of the polymerization reaction is carried out at a temperature ranging between 20° and 90°C, and preferably 40° – 70°C. If the temperature at which the polymerization reaction is initiated is below 20°C., the initial rate of the polymerization is too low, and therefore it is commercially disadvantageous. On the other hand, if the initiation temperature exceeds 90°C., the initial rate of the polymerization becomes so great that difficulty is experienced in adding the amount of initiator necessary for obtaining a polymer having a suitable molecular weight. When the polymerization reaction is started at a relatively low temperature of such as 20°C – 40°C., the initial rate of polymerization is low and, at times, the accumulation of polymerization heat may be too small to raise the temperature of the polymerization system. This likewise happens when the amount of the initiator used is relatively small. This also happens when the scale of the polymerization reaction is small. In this case the amount of heat discharged exceeds the amount of polymerization heat that is accumulated. In cases such as described, it is preferred to assist the temperature rise of the polymerization system by heating the system to a temperature at least 30°C. higher than the polymerization initiation temperature.

It is preferably to carry out the polymerization reaction at a temperature below 150°C. When the polymerization temperature exceeds 150°C, the molecular weight distribution of the resulting polymer often becomes sufficient to give a disadvantageous effect on the processability of the product. Moreover, in the case of butadiene, which is conventionally available in the invention, the pressure of the polymerization system rises rapidly when the polymerization temperature exceeds its critical temperature (152°C). (Kirk-Othmer: Encyclopedia of Chemical Technology, Second Edition Vol. 3, P785 Interscience) Therefore, the polymerization temperature below 150°C is favorable from the standpoint of both safety and economy.

Only by appropriately selecting both the initial polymerization temperature and monomer concentration, is it possible to maintain the maximum polymerization temperature below 150°C without removal of polymerization heat.

No particular restriction is imposed on the pressure of the reaction system as long as it is sufficient to maintain the reaction mixture in the liquid phase. Usual pressure is $1 - 10$ kg/cm$^2$.

In order to randomly copolymerize a conjugated diolefin with a vinyl aromatic hydrocarbon, some randomizers should be used in addition to the lithium type initiator. Generally, the use of randomizer often decreases the 1,4-cis and trans configurations of the diolefin units in the copolymer. However, there are some randomizers having no tendency to decrease the 1,4-cis and trans configurations, for example, anionic surface active compounds having a hydrophillic group represented by —SO$_3$M or —OSO$_3$M, wherein M is Na, K etc., as disclosed in Japanese Patent application No. 25311/1967.

Representative examples shown in the Japanese Patent application are:
1. salts of alkyl-aryl sulfonic acids, such as potassium stearyl benzene sulfonate, potassium dodecyl benzene sulfonate, potassium nonyl benzene sulfonate, potassium decyl benzene sulfonate and sodium derivatives thereof,
2. salts of sulfuric acid esters of higher alcohols, such as potassium stearyl sulfate, potassium dodecyl sulfate, potassium decyl sulfate, potassium nonyl sulfate and sodium derivatives thereof, and
3. potassium N-methyl taurate, methylene bis (potassium naphthalene sulfonate) and sodium derivatives thereof, etc.

In the present invention, a randomizer having no effect on the contents of the 1,4-configuration is preferably used in order to obtain excellent rubbery products.

The randomizer is used in an amount of 0.001 to 10 gram-atoms calculated as the metal atom in the surface active compound per gram atom of lithium metal in the initiator used.

A molecular weight regulator can also be used, if desired.

Upon substantial completion of the reaction, the polymerization is terminated in the customary manner by adding a short stop agent such as water or an alcohol, followed by the addition of a suitable amount of an antioxidant, and then the resulting polymer is isolated, washed and dried.

The process according to the invention is very economical because the polymerization time is short. In addition, since the polymerization temperature in this process varies successively, the resulting polymer has a broad molecular weight distribution. A polymer of this sort excels in its physical properties. Prior to the present invention the molecular weight distribution was broadened by such processes as (1) a process consisting of mixing polymers having different molecular weights and (2) a process wherein the polymerization reaction was carried out by adding portioned amounts of a polymerization initiator incrementally. As compared with these methods, the process of the present invention is not only simpler to practice but also the reaction time is shorter.

The polymer obtained by the invention process is characterized by the following properties: (1) its cold flow is small; (2) the roll processability of the raw rubber is excellent; (3) its tensile strength and elongation are favorable as compared with those of the polymers obtained by the conventional polymerization processes; (4) its cut growth is small. (5) The polymer obtained in the present invention has substantially the same or higher content of the 1,4-configuration in the polydiolefin portions as compared with that of the polymer prepared by the prior art process; (6) there is substantially no difference from the copolymers obtained by the conventional polymerization processes with respect to the monomeric composition of the copolymer; (7) practically no gel is present in the copolymer; and (8) the color of the polymer does not differ from that of the polymers obtained by the conventional polymerization processes.

The following examples are given for the purpose of illustrating the invention. It is to be understood that these examples are not intended to limit the invention in any manner except as it is limited in the appended claims.

Examples I – II and Controls I – II

The copolymerization of 1,3-butadiene with styrene was carried out under the conditions indicated in Table 1. Controls I and II are experiments for purpose of comparison and are out of the scope of the present invention. The polymerization reaction was operated in the following manner. In a thoroughly dried polymerization vessel, after purging with nitrogen, dried and purified solvent and monomer were charged, followed by addition of sufficient n-butyl lithium to inactivate the trace amounts of impurities contained in the system. Then the prescribed amounts of n-butyl lithium and randomizer were added, and the polymerization reaction was initiated. In the case of Control I, heat was removed immediately after the initiation of the polymerization reaction with ice water while in the latter stages of the reaction heating was carried out with hot water in order to maintain a reaction temperature of 50°C. On the other hand, no cooling or heating was carried out at all from the outside in the case of Example I after initiation of the reaction at 50°C. Ten minutes later a reaction temperature of 130°C. was reached, and the polymerization was completed. Control II illustrates the instance where the initiator was portioned and added incrementally. For maintaining a reaction temperature of 50°C., the system was cooled after the first addition of the initiator and the randomizer, but when the conversion reached 20 percent, the system was heated. When the conversion reached 30 percent, the second addition of the initiator and the randomizer was made. In this case also, cooling was carried out immediately after the addition of the initiator, heating being carried out after the conversion reached 50 percent to maintain the temperature at 50°C. In the case of Example II, the reaction was operated as in Control II up to the point where the conversion reached 30 percent, but after the second addition of the initiator and the randomizer, the reaction was carried out with no externally applied cooling or heating at all. Ten minutes later, the reaction temperature rose to 110°C. and a conversion of 100 percent was attained.

After having carried out the reactions for the prescribed period, the reactions of Examples I – II and Controls I – II were in all cases terminated by the addition of a small quantity of isopropyl alcohol to the polymerization systems. As an antioxidant, 1.5 parts by weight of 2,6-ditertiarybutyl-p-cresol per 100 parts by weight of the polymer was added to the polymerization solution. This was followed by the removal of the solvent with steam and thereafter drying the polymer for 30 hours at 50°C.

The properties of the polymers are shown in Table 2. When Control I is compared with Example I, it is evident that the cold flow has been greatly improved in the case of Example I which was carried out in accordance with the present invention. The roll processability of the polymer (crude rubber) is also superior in the case of the polymer obtained in Example I. Further, when the properties of the vulcanizates of the polymers, such as modulus at 300 percent, tensile strength, elongation, tear strength at both room and elevated temperatures and cut growth, are compared, it is seen that improvements are demonstrated in practically all cases. In Control II the polymerization reaction was carried out by adding the initiator in portioned amounts incrementally in order to spread the molecular weight distribution of the polymer. In consequence, substantially no difference is noted in the unvulcanized as well as vulcanized products of the polymer of Control II as compared with those obtained in Example II, which was carried in accordance with the invention process. However, Example II is superior in that the reaction time is less than one-half that in Control II.

TABLE 2

| Experiment number | Control I | Example I | Control II | Example II |
|---|---|---|---|---|
| Microstructure of the polybutadiene portion: | | | | |
| Cis (percent) | 38 | 39 | 39 | 38 |
| Trans (percent) | 47 | 47 | 46 | 49 |
| Vinyl (percent) | 15 | 14 | 15 | 13 |
| Bonded styrene (percent) | 25 | 25 | 25 | 25 |
| Gel content (percent) | 0 | 0 | 0 | 0 |
| Intrinsic viscosity [η] in toluene at 30° C | 2.3 | 1.9 | 3.1 | 2.6 |
| Mooney viscosity ML$_{1+4}$ 100° C | 50 | 48 | 52 | 50 |
| Cold flow (mg./min.) | 8.0 | 0.2 | 0.1 | 0.0 |
| Roll processability of crude rubber | Poor | Excellent | Excellent | Good |
| Properties of vulcanizate: | | | | |
| Hardness (JIS-Hs) | 62 | 61 | 61 | 61 |
| Modulus at 300% (kg./cm.$^2$) | 75 | 78 | 72 | 74 |
| Tensile strength (kg./cm.$^2$) | 200 | 245 | 255 | 255 |
| Elongation (percent) | 550 | 650 | 640 | 640 |
| Tear strength: | | | | |
| 20° C. (kg./cm.$^2$) | 47 | 53 | 58 | 50 |
| 100° C. (kg./cm.$^2$) | 36 | 40 | 41 | 39 |
| Cut growth (number of rotation required for the crack to grow 10 mm.) | 11,000 | 38,000 | 14,000 | 19,000 |

Notes.
1. Microstructure of the polybutadiene portion: calculated by the method of D. Morero, Chim, e. Lindustria 91, 758 (1959).
2. Bonded styrene: Determined from the refractive index.
3. Mooney viscosity: Measured at 100°C. with a Goodrich Mooney viscometer.
4. Cold flow: Measured by extruding the polymer through a ¼-inch orifice at a pressure of 3.5 lb./in.$^2$ and a temperature of 50°C. In order to measure at a steady state the extrusion speed was measured after allowing the extrusion to continue for 10 minutes. The so obtained value was expressed in figure of milligrams per minute.
5. Roll processability of crude rubber: This was indicated by a composite evaluation of roll banding property, luster and smoothness of crude rubber under the conditions of a roll temperature 80°C., 6-inch rolls, rotation of 14/17 rpm, roll clearance of 2 mm and roll width of 170 mm.
6. Vulcanization conditions: 145°C., 45 minutes.

Compounding Ingredients

| | Weight Parts |
|---|---|
| Rubber | 100 |
| Carbon black (HAF) | 40 |
| Aromatic process oil | 5 |
| Zinc white | 3 |
| Stearic acid | 2 |
| Antioxidant (N-phenyl-N'-isopropyl-p-phenylenediamine) | 1 |
| Vulcanization accelerator (cyclohexyl-benzothiazyl-sulfonamide) | 0.8 |
| Sulfur | 1.75 |

TABLE 1

| Experiment number | Amount of initiator used | | Amount of randomizer used | | Rate of polymerization conversion at second addition (percent) | Reaction temperature, ° C. | Reaction time (min.) | Final rate of polymerization conversion (percent) |
|---|---|---|---|---|---|---|---|---|
| | First addition (mhm.) | Second addition (mhm.) | First addition (mhm.) | Second addition (mhm.) | | | | |
| Control I | 0.500 | | 0.050 | | | 50 | 130 | 97 |
| Example I | 0.590 | | 0.059 | | | 50–130 | 10 | 100 |
| Control II | 0.055 | 0.470 | 0.011 | 0.047 | 30 | 50 | 205 | 98 |
| Example II | 0.055 | 0.470 | 0.011 | 0.047 | 30 | 50–110 | 85 | 100 |

Notes.—1. (mhm.) is millimoles per 100 grams of monomer.
2. Solvent: 400 parts by weight cyclohexane per 100 parts by weight of monomer.
3. Monomer: 75 parts by weight of 1,3-butadiene and 25 parts by weight of styrene used. Total amount of monomer used was 500 grams.
4. Randomizer: Potassium dodecylbenzenesulfonate.

Examples III – VI

In a completely dried polymerization vessel (6L.), after purging with nitrogen, 3,150 g. of cyclohexane, 700 g. of butadiene and styrene whose charge ratio is variable and a prescribed amount of potassium dodecylbenzene sulfonate were charged, followed by heating to 50°C. Then, in order to remove the trace amounts of impurities contained in the polymerization system, n-butyl lithium in an amount just sufficient to react with the impurities was added. Thereafter, the polymerization was initiated by the prescribed amount of n-butyl lithium and carried out with neither application of heat nor removal of polymerization heat.

After completion of the polymerization reaction, the product was isolated, washed and dried in a similar procedure to that described in Examples I and II.

Polymerization conditions and the physical properties of the products are summarized in Tables 3 and 4.

TABLE 3

| Example No. | III | IV | V | VI |
|---|---|---|---|---|
| BD/ST ratio by wt. | 65/35 | 75/25 | 85/15 | 95/5 |
| nBuLi, (mmole) | 4.18 | 4.36 | 4.10 | 3.64 |
| DBS-K * (mmole) | 0.418 | 0.391 | 0.330 | 0.218 |
| Polymerization Temp. (°C) | 50 – 118 | 50 – 132 | 50 – 130 | 50 – 136 |
| Polymerization Time (min.) | 12 | 8 | 12 | 12 |
| Conversion (%) | 100 | 100 | 100 | 100 |
| [η] in toluene at 30°C. | 1.55 | 1.73 | 1.89 | 2.17 |

* DBS-K : Potassium dodecylbenzene sulfonate.

TABLE 4

| Example No. | III | IV | V | VI |
|---|---|---|---|---|
| ML$_{1+4}$ at 100°C. | 46.5 | 56.5 | 42.5 | 46.5 |
| Microstructure of raw polymer | | | | |
| cis (%) | 35 | 37 | 36 | 38 |
| trans (%) | 48 | 48 | 49 | 49 |
| 1,2 vinyl (%) | 17 | 15 | 15 | 13 |
| Cold flow | 1.6 | 0.30 | 0.42 | 0.66 |
| Roll processability | excellent | excellent | excellent | excellent |
| Hardness [JIS K6301 (Hs)] | 62 | 61 | 61 | 61 |
| Modulus at 300 % (kg/cm²) | 80 | 75 | 80 | 76 |
| Tensile strength (kg/cm²) | 250 | 253 | 246 | 207 |
| Elongation (%) | 580 | 600 | 580 | 550 |
| Tear strength (kg/cm²) | | | | |
| at room temp. | 53 | 50 | 49 | 45 |
| at 100°C. | 39 | 38 | 38 | 32 |

Compounding recipes and vulcanization conditions are the same as those given in Examples I and II.

Examples VII and VIII

To a completely dried polymerization vessel (16L.), after purging with nitrogen, 8.0 kg. of cyclohexane, 0.5 kg. of styrene, 1.5 kg. of butadiene and a prescribed amount of potassium dodecylbenzene sulfonate were added, followed by heating to the desired initiation temperature. The polymerization reaction and recovery of the polymer were carried out by similar procedures to those described in Example I. Evaluation of the polymer was also conducted in the same manner as shown in Example I. Results are given in Table 5.

TABLE 5

| Example No. | I | VII | VIII |
|---|---|---|---|
| n-Butyl lithium (mhm) | 0.590 | 0.820 | 0.850 |
| DBS-K** (mhm) | 0.059 | 0.119 | 0.119 |
| Polymerization | | | |
| initiation temp. (°C.) | 50 | 70 | 90 |
| maximum temp. (°C.) | 130 | 139 | 147 |
| time (min.) | 10 | 3 | 2 |
| conversion (%) | 100 | 100 | 100 |
| Microstructure of raw polymer | | | |
| 1,4-cis (%) | 39 | 38 | 36 |
| 1,4-trans (%) | 47 | 47 | 47 |
| 1,2-vinyl (%) | 14 | 15 | 14 |
| [η] in toluene at 30°C. | 1.9 | 1.8 | 1.8 |
| Gel (%) | 0 | 0 | 0 |
| ML$_{1+4}$ at 100°C. | 48 | 49.5 | 47 |
| Cold flow (mg/min) | 0.2 | 0.7 | 0.4 |
| Roll processability | excellent | excellent | excellent |
| Hardness (JIS) | 61 | 61 | 61 |
| Modulus at 300 % (kg/cm²) | 78 | 89 | 85 |
| Tensile strength (kg/cm²) | 245 | 221 | 233 |
| Elongation (%) | 650 | 660 | 660 |
| Tear strength (kg/cm²) | | | |
| at room temp. | 53 | 58 | 55 |
| at 100°C. | 40 | 38 | 41 |

* (mhm): millimoles per 100 grams of the monomers
** DBS-K: Potassium dodecylbenzene sulfonate

Example IX

In a similar manner to that described in Example I, 780 g. of butadiene and 260 g. of styrene were copolymerized in the presence of 0.06 millimoles of potassium dodecylbenzene sulfonate by adding 0.624 millimoles of n-butyl lithium initiator. As a solvent, 6,250 g. of benzene were used. The polymerization reaction was initiated at 50°C and carried out with neither application of heating nor removal of polymerization heat. The maximum polymerization temperature was attained to 102°C. For completion of the polymerization reaction, 15 minutes were necessary. Termination, recovery of the polymer and evaluation of the product were conducted in a similar manner to that described in Example I.

The physical properties of the polymer obtained were equivalent to those of Example I.

We claim:

1. A process for copolymerization of a conjugated diolefin with a vinyl aromatic hydrocarbon which comprises effecting the copolymerization by using a lithium type initiator selected from metallic lithium and organolithium compounds in the presence of a randomizer selected from anionic surface active compounds having a hydrophilic group represented by —SO$_3$M or —OSO$_3$M where M is Na or K, selected from salts of alkyl aryl sulfonic acids, salts of sulfuric acid esters of higher alcohols, salts of N-methyl taurine and salts of methylene bis (naphthalene sulfonic acid), in 1 – 20 parts by weight of a hydrocarbon or halogenated hydrocarbon solvent per 1 part by weight of the monomers, initiating the polymerization reaction at 20°C. – 90°C. and polymerizing substantially all of the monomers at the maximum temperature below 150°C. without removal of polymerization heat.

2. The process of claim 1 wherein the conjugated diolefin is selected from the group consisting of 1,3-butadiene, isoprene and piperylene.

3. The process of claim 1 wherein the vinyl aromatic hydrocarbon is selected from the group consisting of styrene, divinylbenzene, alpha-methyl styrene and vinyl toluene.

4. The process of claim 1 wherein the temperature at which the polymerization is initiated ranges from 40°C. – 70°C.

5. The process of claim 1 wherein the solvent is selected from the group consisting of n-pentane, n-hexane, n-heptane, iso-octane, cyclohexane, benzene, toluene, xylene, chlorobenzene and dichlorobenzene.

6. The process of claim 1 wherein the solvent is used in an amount of 2 – 10 parts by weight per 1 part by weight of the monomers.

7. The process of claim 1 wherein the randomizer is selected from the group consisting of potassium stearyl-benzene sulfonate, potassium dodecylbenzene sulfonate, potassium nonylbenzene sulfonate, potassium decylbenzene sulfonate, potassium stearyl sulfate, potassium dodecyl sulfate, potassium decyl sulfate, potassium nonyl sulfate, potassium N-methyl taurate, methylene bis(potassium naphthalene sulfonate) and sodium derivatives of the compounds mentioned above.

8. The process of claim 1 wherein the randomizer is used in an amount of 0.001 – 10 gram atoms calculated as the metal atom in the randomizer per 1 gram atom calculated as the lithium atom in the initiator.

9. The process of claim 1 wherein the lithium type initiator is selected from the group consisting of ethyl lithium, n-butyl lithium, sec-butyl lithium, tert.-butyl lithium, phenyl lithium, vinyl lithium, and teramethylene dilithium.

10. The process of claim 1 wherein the initiator is used in an amount of 0.02 – 2 millimoles per 100 grams of the monomers.

11. The process of claim 10 wherein the initiator is used in an amount of 0.05 – 1 millimole per 100 grams of the monomers.

* * * * *